United States Patent [19]
Zoscak

[11] Patent Number: 5,291,577
[45] Date of Patent: Mar. 1, 1994

[54] OPTIC FIBER ORNAMENT

[76] Inventor: Donald P. Zoscak, 7702 Appomattox Ave., Manassas, Va. 22111

[21] Appl. No.: 985,933

[22] Filed: Dec. 4, 1992

[51] Int. Cl.$^5$ .............................................. G02B 6/04
[52] U.S. Cl. ........................................ 385/147; 40/427; 362/32; 385/115; 385/901
[58] Field of Search ....................... 385/115, 147, 901; 362/32; 40/427, 431, 441, 442, 541, 547

[56] References Cited

U.S. PATENT DOCUMENTS

| | | | |
|---|---|---|---|
| 3,431,410 | 3/1969 | Dolan et al. | 40/433 |
| 3,624,385 | 11/1971 | Wall | 385/115 X |
| 3,644,725 | 2/1972 | Lochridge, Jr. | 385/901 X |
| 3,727,043 | 4/1973 | Wall | 362/32 |
| 3,727,044 | 4/1973 | Monroy | 385/147 X |
| 3,766,376 | 10/1973 | Sadacca et al. | 385/115 X |
| 3,767,910 | 10/1973 | Harrigan | 385/901 X |
| 3,803,398 | 4/1974 | Walker | 385/115 X |
| 4,080,045 | 3/1978 | Nakatsubo et al. | 385/115 |
| 4,097,917 | 6/1978 | McCaslin | 362/32 |
| 4,206,495 | 3/1980 | McCaslin | 362/32 |
| 4,279,089 | 7/1981 | Murakami | 40/547 |
| 4,998,186 | 3/1991 | Cocca | 362/103 |

Primary Examiner—John D. Lee
Attorney, Agent, or Firm—Richard C. Litman

[57] ABSTRACT

The present invention comprises an illuminated fiber ornament which can be interconnected to like ornaments to form a multitude of shapes. The ornament has stiffened optic fibers which provides rigidity not found in the prior art while retaining flexibility and resilience. The ornament can be made in specific, permanent shapes, such as a child's toy stuffed teddy bear. The ornament can also be provided as modular units which can be assembled and modified to provide personalized designs. The light transmission and light dispersion patterns of the ornament may be varied by the inclusion of light altering material in the ornament and by deforming the ends of the optic fibers. Preferred materials include synthetic polymers for a central solid member, and polystyrene filament for optic fibers. The preferred stiffener for the optic fibers is acrylic coating.

17 Claims, 4 Drawing Sheets

OPTIC FIBER ORNAMENT

BACKGROUND OF THE INVENTION

1. Field of the Invention

The present invention relates to an illuminated fiber ornament which comprises a complete, self-contained ornament or which can be joined in modular fashion to like ornaments to form a multitude of shapes.

2. Description of the Prior Art

Lighted ornaments delight the public, as exemplified by fictitious figures such as Santa Claus, popularly displayed during the Christmas season, and other items, such as illuminated stars mounted atop Christmas trees. Fiber optic materials are useful to add aesthetic delight to such ornaments. As currently practiced, the shapes of current fiber optic decorative devices are sprays, as dictated by current construction in light of the force of gravity. As with any ornamental device, the availability of one, and only one, configuration is a drawback. The popularity of the simple spray dwindles as the novelty of its appearance wears off.

Fiber optic filaments may lack rigidity, since they are made from a material selected to provide a compromise between rigidity and efficiency of light transmission. Typical fiber optic ornaments bind the fiber optic filaments together at one end and leave the opposite end unrestrained. This type of construction results in a fiber optic ornament of spray shape, wherein the unrestrained end portions of the fiber optic filaments droop responsive to gravity.

Introducing rigidity to individual optic fiber filaments would allow for the creation of optic fiber ornaments of permanent and specific shape, wherein the collective ends of radiating optic filaments define the outer boundary, and hence the shape, of the ornament. With such construction, the number of possible shapes to be created becomes virtually infinite.

Exemplary of such fiber optic sprays are U.S. Pat. No. 3,624,385, issued Nov. 30, 1971 to Lamar J. Wall, U.S. Pat. No. 4,998,186, issued Mar. 5, 1991 to Lorraine Cocca, and U.S. Pat. No. 3,431,410, issued Mar. 4, 1969 to B. J. Dolan et al. Additionally, U.S. Pat. No. 3,766,376, issued Oct. 16, 1973 to Sadacca et al, discloses a Christmas tree illuminated by a multiplicity of optic sprays. Further effects are seen in U.S. Pat. No. 4,097,917, issued Jun. 27, 1978 to Robert E. McCaslin, and U.S. Pat. No. 4,206,495, issued Jun. 3, 1980 to Robert E. McCaslin, these patents disclosing, respectively, a fiber optic spray device which is rotated and a fiber optic spray device in which the optic spray fibers reciprocate.

U.S. Pat. No. 4,080,045, issued Mar. 21, 1978 to Nakatsubo et al, discloses bundling of a plurality of flexible optic fibers to provide strength against bending. Nakatsubo et al. also discloses coating the bundle of flexible optic fibers with an opaque coating, preferably a resin coating, the purpose relating to limiting escape of light from the fiber. Flexibility of the bundle and rigidity of individual fibers are unaffected by the opaque coating.

None of the above inventions and patents, taken either singly or in combination, is seen to describe the instant invention as claimed.

SUMMARY OF THE INVENTION

The present invention comprises an illuminated fiber ornament comprising a base having radially projecting optic fibers. The fibers are made from polymers such as polystyrene, to which a coat of another polymer, such as acrylic, is applied to increase fiber stiffness. This enables each individual fiber to stand without external support. Although fibers bend under gravity, they nonetheless retain sufficient regidity to remain sufficiently erect to describe an outer boundary shape at the collective ends of the fibers. Although the outer boundary exhibits localized deflection, the shape described by the collective ends of the optic fibers remains recognizable.

A light source, for example, an incandescent lamp, is provided either integrally with the base, or light from the source is introduced into the base indirectly. This light passes through the optic fibers, and becomes visible at the outer fiber terminals. A pattern of points of light, each point being defined by diffusion of light at the end of an individual fiber, demarcates the outer boundary shape.

The invention is practiced under two embodiments. In a first embodiment, the invention comprises a single, preformed ornament which stands alone, defining a recognizable shape. In a second embodiment, flat, modular units having optic fibers projecting only from a periphery thereof present blank surfaces enabling one module to be joined to like ornaments to form a multitude of shapes. Second embodiment ornaments modules are provided in standard shapes for assembly, shaping, and final modification, as by a retail consumer.

In further alternative embodiments, the base is coated or otherwise treated to modify light from the source. The light may be colored, diffracted, or internally reflected.

Accordingly, it is a principal object of the invention to provide an optic fiber ornament having stiffened optic fibers which collectively demarcate a specific shape at the fiber ends.

It is another object of the invention to provide an optic fiber ornament an outer demarcated shape of which is readily modified.

It is a further object of the invention to provide an optic fiber ornament which is readily modified to vary light diffusion characteristics of each fiber.

It is another object of the invention to provide an optic fiber ornament which is readily joined to another such ornament to provide selectively variable configurations.

Still another object of the invention is to provide an optic fiber ornament with individual optic filaments of adequate stiffness to maintain a collective demarcated outer shape and still retain flexibility adequate to deflect the fiber upon light pressure, the ornament reassuming its former shape upon removal of the light pressure.

An additional object of the invention is to provide an optic fiber ornament made of material which will not readily puncture or cut human skin.

It is another object of the invention to provide an optic fiber ornament which includes a light source.

It is a further objection of the invention to provide an optic fiber ornament that has a central body which includes light altering material, thus altering and enhancing the light transmission of the ornament.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
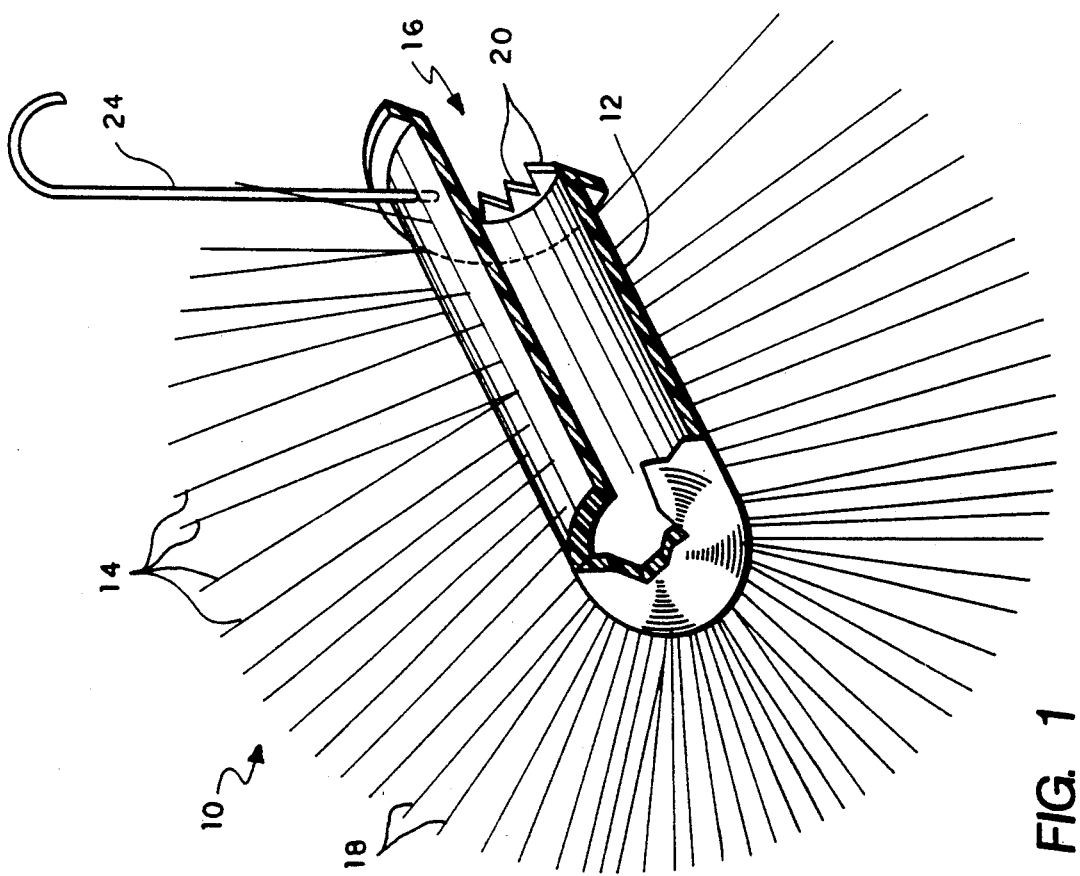
FIG. 1 is a perspective view of one embodiment of the present invention, partially broken away to reveal internal detail.

The present invention improves upon optic fiber ornaments by imparting sufficient stiffness to each individual fiber, enabling each fiber to stand erect without requiring external support. FIG. 1 shows an embodiment of the invention 10 usable to expand upon the visual impact of small decorative lamps, as are typically employed with Christmas trees (not shown). The novel optic fiber ornament 10 has a central body 12 to support optic fibers 14 radiating therefrom. In this embodiment, the central body 12 comprises a hollow cylinder, domed at one end. Optic fibers 14 are embedded in the central body 12, and transmit light from an open core 16 defined in the hollow cylinder. This light is not visible until it strikes an outer end 18 of the optic fiber 14, where it is diffused, and becomes highly conspicuous. The outer ends 18 of the optic fibers 14 are arranged to describe a substantially planar outer boundary, thus creating the impression of a surface. This perceived surface determines a perceived shape of the ornament 10.

Figure 2:
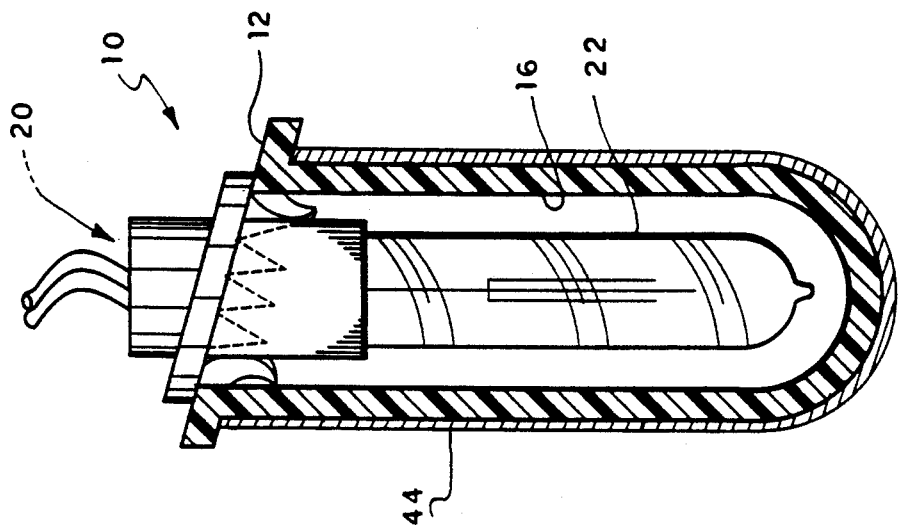
FIG. 2 is an elevational view, partly in section, of a second embodiment of the present invention.

More clearly seen in FIG. 2, the central body 12 includes projections 20 which enable a miniature incandescent lamp 22 to be secured within the open core 16. A hook 24 anchored in the central body 12 enables the ornament 10 to be suspended from an object (not shown) in its environment. In the present example, the novel ornament 10 is usable as a Christmas tree ornament, light being provided by an otherwise conventional Christmas tree incandescent light, the ornament 10 being suspended from a branch (not shown) by the hook 24.

Individual optic fibers 14 are preferably made from polystyrene filaments having a diameter of 0.25 to 0.5 mm. This material, commercially available in bulk, is desirable because it transmits light, has a high index of refraction, is readily cut by common tools, such as utility knives or scissors, and can be melted by application of heat.

Figure 3:
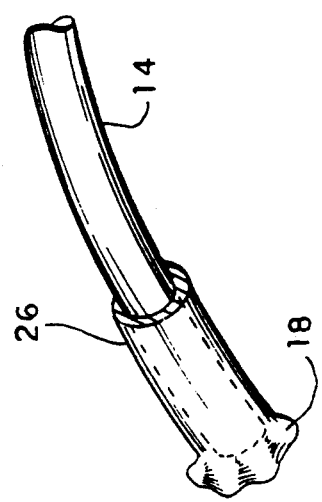
FIG. 3 is a perspective detail view of an individual optic fiber, partially broken away to reveal fiber construction.

The optic fibers 14 are coated with a polymer having a low index of refraction, such as acrylic 26, as shown in FIG. 3. The contrast between the high index of refraction of the polystyrene core and the low index of refraction of the acrylic coating improves the overall light transmitting capabilities of the optic fiber, while producing a fiber that is both rigid and resilient. Rigidity is sufficient to enable an individual optic fiber 14 to stand erect, that is, arching under the influence of gravity, but not so as to depend upon another optic fiber 14 or any other object for support, within the limits dictated by fiber usable length. When the optic fibers 14 are selected from the diameter range discussed above, the usable length extends to about 25 cm. The optic fibers are also resilient and flexible. In addition to arching as previously mentioned, each optic fiber 14 will bend or deflect upon application of light pressure, as by the touch of a person's hand. The optic fiber 14 yields to this pressure, and reassumes its former configuration when the pressure is removed. Polystyrene also forms optic fiber ends 18 sufficiently dull as not to puncture skin, as during touching by a person's hand.

Figure 7:
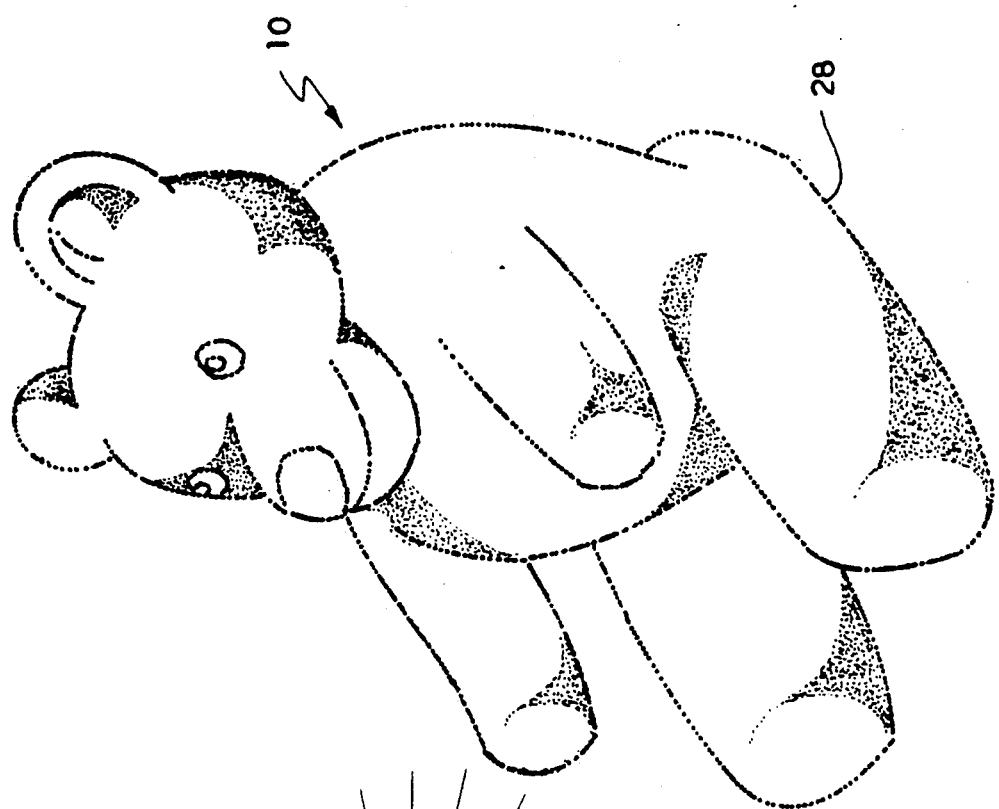
FIG. 7 is a perspective of the embodiment shown in FIG. 6.
Figure 6:
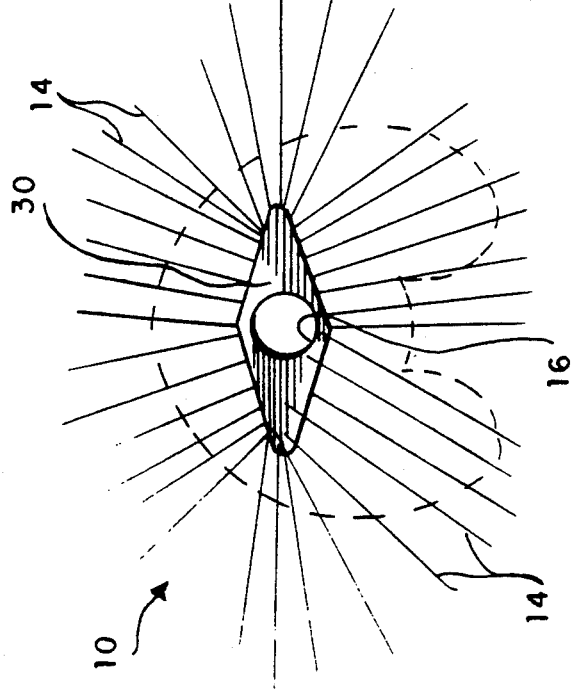
FIG. 6 is a bottom plan view of still another embodiment of the present invention.

The central body 12 is molded to have a desired configuration. If all optic fibers 14 project from the central body 12 the same distance, then the central body configuration will determine the overall ornament configuration. This configuration may simulate a known object, such as a child's stuffed toy bear 28, as shown in FIG. 7. Embodiments of the invention 10 which are preformed to simulate an object have a free surface 30 not bearing optic fibers 14, as seen in FIG. 6, thus enabling the ornament 10 to sit upon a flat environmental surface (not shown). Preferably, the open core 16 penetrates the free surface 30, rather than penetrating a surface bearing a considerable number of thin, flexible optic fibers 14.

The central body 12 is preferably molded from a synthetic polymer, such as polycarbonate, polystyrene, or acrylic. The material must be capable of being molded around the optic fibers 14, and is preferably transparent. In a preferred embodiment, material used for the central body 12 is the same as a material selected to form optic fibers 14, and in fact, the central body 12 and optic fibers 14 may be manufactured integrally.

Figure 4:
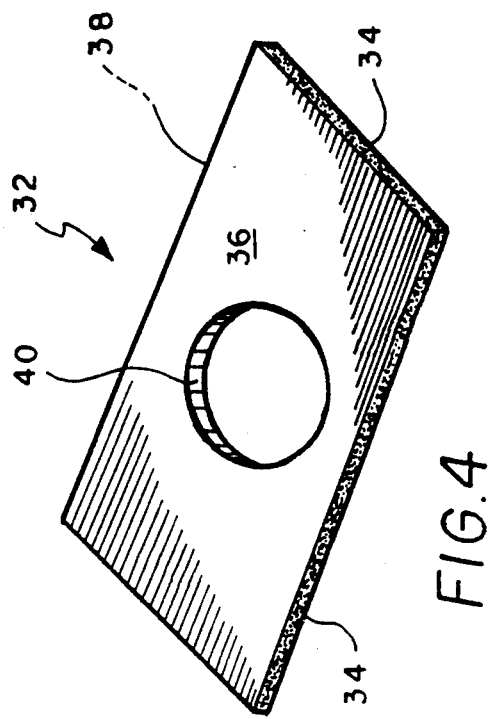
FIG. 4 is a top perspective view of an alternative embodiment of the central body.

The ornament 10 also enables a person to alter or create an overall shape, or to modify appearance aspects thereof. Modular ornament units 32, such as the wafer shown in FIG. 4, may be provided. Outer peripheral surfaces 34, indicated by stippling, bear optic fibers 14. Large upper and lower surfaces 36,38, not having optic fibers 14, enable the modular unit 32 to be stacked as desired, and joined. As seen in the disc-like embodiment of FIG. 5, modular units 32 may also be joined end to end, although it is preferable to stack modular units 32 so that central holes 40 coincide, thus building up an open core 16. It would be possible to reproduce the shape of the ornament 10 illustrated in FIG. 7 by appropriate modification as discussed above.

Figure 5:
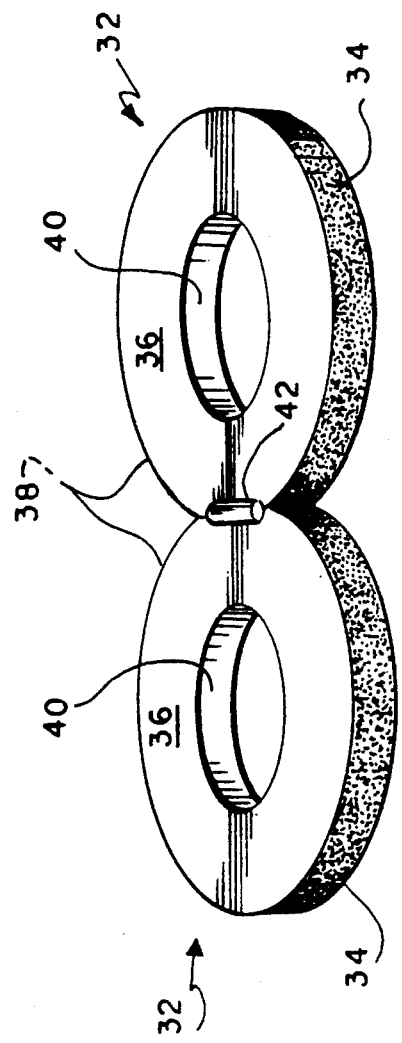
FIG. 5 is a top perspective view of another alternative embodiment of the central body.

Methods of joining modular units 32 include ultrasonic or heat welding, resulting in a welding bead 42 seen in FIG. 5, application of adhesives (not shown), or application of solvent (not shown).

Since the optic fibers 14 are thus readily cut, it is possible for a person to modify the overall shape by suitably trimming some or all of the optic fibers 14. It is also possible to modify the appearance presented by light being diffused at the fiber optic outer ends 18. Melting or deforming fiber ends 18, as by compressing, a deformed end 18 being illustrated in FIG. 3, can be performed to modify the pattern of light being diffused at the ornament outer boundary. This influences the apparent surface texture, rather than the overall shape, of the ornament 10.

The appearance of the central body 12 can also be modified. As seen in FIG. 2, light altering coating or polymer additive 44 may be applied. The modification may cause internal reflection, thus intensifying light escaping through the optic fibers 14; it may cause the central body 12 to assume a particular color; and it may diffract light transmitted through the central body 12, as by breaking white light into the spectrum of varieties of visible light, or may exhibit other light altering properties.

Figure 8:
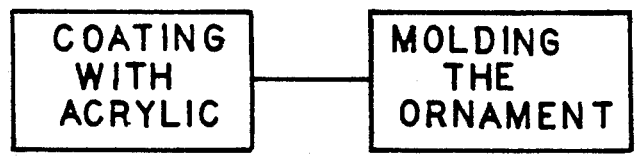
FIG. 8 is a block diagram of one method of manufacture of the invention.
Figure 9:
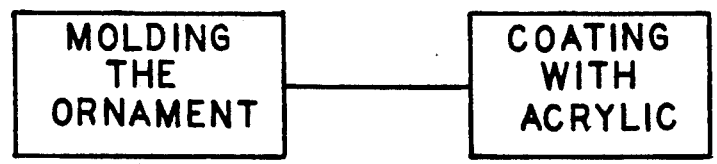
FIG. 9 is a block diagram of an alternative method of manufacture of the invention.

As shown in FIG. 8, and reading left to right, the ornament 10 is manufactured by coating optic fibers 14 with acrylic 26, then molding the central body 12 so as to embed the optic fibers 14. Alternatively, as shown in FIG. 9, the acrylic coating 26 may be applied as a final step, after molding the central body 12 around the optic fibers 14. If the ornament 10 is formed integrally with the optic fibers 14, the steps illustrated in FIG. 9 would also apply.

It is to be understood that the present invention is not limited to the embodiments described above, but encompasses any and all embodiments within the scope of the following claims.

I claim:

1. A fiber optic ornament, comprising:
a central body comprising a moldable material;
optic fibers each having proximal and distal ends, rigidity, and light transmissive capability, said optic fiber proximal ends being supported in said central body, said optic fibers being arranged to radiate from said central body, said optic fiber distal ends collectively demarcating an outer boundary of said ornament, thus defining an ornament specific shape, and diffusing light therefrom;
said distal ends of said optic fibers being cuttable;
said distal ends of said optic fibers being deformable by melting and molding;
said distal ends of said optic fibers forming an apparent surface of said fiber optic ornament; and
said central body has means enabling connection to at least one other central body, whereby
said apparent surface is modified by melting, molding and cutting said distal ends of said optic fibers.

2. The ornament according to claim 1, wherein said central body includes attachment means engaging another object, whereby said ornament is suspended from the other object.

3. The ornament according to claim 1, said central body having light altering means, whereby light transmitted from a light source is altered.

4. The ornament according to claim 1, wherein said central body further includes a light source and supporting means therefor.

5. The ornament according to claim 4, wherein said light source supporting means includes means defining a central body open central core.

6. The ornament according to claim 1, wherein said moldable material is a synthetic polymer.

7. The ornament according to claim 1, wherein said optic fibers are made from a resilient plastic material which deflects under stress.

8. The ornament according to claim 1, further comprising:
coating means surrounding each of said optic fibers wherein said coating means has rigidity greater than said rigidity of said optic fibers, said optic fibers being rendered erect and remaining resilient and flexible;
wherein said coating means comprises a synthetic polymer.

9. A fiber optic ornament, comprising:
a central body comprising a moldable material;
optic fibers each having proximal and distal ends, rigidity, and light transmissive capability, said optic fiber proximal ends being supported in said central body, said optic fibers being arranged to radiate from said central body, said optic fiber distal ends collectively demarcating an outer boundary of said ornament, thus defining an ornament specific shape, and diffusing light therefrom;
said distal ends of said optic fibers being cuttable;
said distal ends of said optic fibers being deformable by melting and molding;
said distal ends of said optic fibers forming an apparent surface of said fiber optic ornament;
said central body defining an open core and having attachment means enabling attachment of said ornament to another object, and having means engaging and supporting a light source within said open core; and
said central body attachment means comprises an external surface having a first portion supporting said optic fibers and a second portion being unencumbered by said optic fibers, whereby said central body is readily joined to another central body, thus enabling creation of selectively variable ornament configurations and said apparent surface is modified by melting, molding and cutting said distal ends of said optic fibers.

10. The ornament according to claim 9, wherein said central body further includes light altering material whereby light being transmitted from said light source is altered.

11. The ornament according to claim 9, wherein said central body is made from a synthetic polymer.

12. A method for manufacturing a fiber optic ornament comprising:
a) cutting outer tips of individual optic fibers;
b) molding an ornament having optic fibers projecting therefrom;
c) melting outer tips of said individual optic fibers; and
d) molding said outer tips of said individual optic fibers, whereby said melting, said molding and said cutting of said outer tips is performed by a retail consumer.

13. The method for manufacturing a fiber optic ornament of claim 12, further comprising the step of coating individual fibers, said coating step further comprising coating individual optic fibers with a stiffening material.

14. The method for manufacturing a fiber optic ornament of claim 13, said coating step further comprising coating individual optic fibers with a material having a lower index of refraction than the index of refraction of the optic fibers.

15. A method for manufacturing a fiber optic ornament comprising:
a) molding an ornament having optic fibers projecting therefrom;
b) cutting outer tips of said optic fibers;

c) melting outer tips of said individual optic fibers; and d) molding said outer tips of said individual optic fibers whereby a retail consumer performs said melting, said molding and said cutting of said outer tips.

16. The method for manufacturing a fiber optic ornament of claim 15, further comprising the step of coating individual optic fibers, said coating step further comprising coating individual optic fibers with a stiffening material.

17. The method for manufacturing a fiber optic ornament of claim 16, said coating step further comprising coating individual optic fibers with a material having a lower index of refraction than the index of refraction of the optic fibers.

* * * * *